United States Patent
Wu et al.

(10) Patent No.: US 9,547,721 B2
(45) Date of Patent: *Jan. 17, 2017

(54) NATIVE APPLICATION SEARCH RESULTS

(71) Applicant: Google Inc., Mountain View, CA (US)

(72) Inventors: Xiao Dao Wu, Beijing (CN); Chao Ma, Beijing (CN); Yiteng Zhang, Beijing (CN)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/061,674

(22) Filed: Mar. 4, 2016

(65) Prior Publication Data
US 2016/0188737 A1    Jun. 30, 2016

Related U.S. Application Data (63) Continuation of application No. 14/019,157, filed on Sep. 5, 2013, now Pat. No. 9,311,407.

(51) Int. Cl.
*G06F 17/30* (2006.01)

(52) U.S. Cl.
CPC ..... *G06F 17/30867* (2013.01); *G06F 17/3056* (2013.01); *G06F 17/30528* (2013.01); *G06F 17/30554* (2013.01); *G06F 17/30861* (2013.01); *G06F 17/30864* (2013.01); *G06F 17/30876* (2013.01); *G06F 17/30893* (2013.01)

(58) Field of Classification Search
CPC .................. G06F 17/30864; G06F 17/30876; G06F 17/30893
See application file for complete search history.

(56) References Cited

U.S. PATENT DOCUMENTS

| 7,617,225 B2 | 11/2009 | Arrouye |
| 8,086,957 B2 | 12/2011 | Bauchot |
| 8,458,384 B2 | 6/2013 | Johnson |
| 8,510,764 B1 | 8/2013 | Deselaers |

(Continued)

FOREIGN PATENT DOCUMENTS

| EP | 2474905 | 7/2012 |
| EP | 2482159 | 8/2012 |
| EP | 2495670 | 9/2012 |

OTHER PUBLICATIONS

"Adding deep linking to Google+ posts shared from your iOS app," [online][Retrieved on Jan. 7, 2014]; Retrieved from the Internet URL: https://developers.google.com/+/mobile/ios/share/deep-link; 3 pages.

(Continued)

*Primary Examiner* — Scott A Waldron
(74) *Attorney, Agent, or Firm* — Fish & Richardson P.C.

(57) ABSTRACT

Methods, systems, and apparatus, including computer programs encoded on a computer storage medium, for determining that a first web resource responsive to a query includes content for which synchronized content is accessible by a native application installed on a user device, and in response to this determination generating a native application search result that includes native application request data that causes the native application installed on the user device to request the synchronized content and providing web resource search results and the native application search result to the user device, each respective web search result referencing a respective one of the web resources.

14 Claims, 4 Drawing Sheets

(56) References Cited

U.S. PATENT DOCUMENTS

| | | | |
|---|---|---|---|
| 8,515,979 | B2 | 8/2013 | Mehta |
| 8,554,345 | B2 | 10/2013 | Fernandez |
| 8,595,450 | B2 | 11/2013 | Nguyen |
| 9,203,891 | B2 | 12/2015 | Bilange |
| 2002/0126120 | A1 | 9/2002 | Snowdon et al. |
| 2004/0030882 | A1 | 2/2004 | Forman |
| 2007/0209080 | A1 | 9/2007 | Ture |
| 2010/0169334 | A1 | 7/2010 | Dos Santos |
| 2010/0257466 | A1 | 10/2010 | Wroblewski |
| 2010/0306191 | A1 | 12/2010 | LeBeau |
| 2011/0208801 | A1 | 8/2011 | Thorkelsson |
| 2011/0252038 | A1 | 10/2011 | Schmidt |
| 2011/0314004 | A1 | 12/2011 | Mehta |
| 2012/0124061 | A1 | 5/2012 | Macbeth et al. |
| 2012/0179706 | A1 | 7/2012 | Hobbs |
| 2012/0179955 | A1 | 7/2012 | French |
| 2012/0290584 | A1 | 11/2012 | De Bona et al. |
| 2012/0316955 | A1 | 12/2012 | Panguluri et al. |
| 2012/0323898 | A1 | 12/2012 | Kumar |
| 2013/0006897 | A1 | 1/2013 | Jain |
| 2013/0110815 | A1 | 5/2013 | Tankovich |
| 2013/0111328 | A1 | 5/2013 | Khanna |
| 2013/0122861 | A1 | 5/2013 | Kim |
| 2013/0124606 | A1 | 5/2013 | Carpenter |
| 2013/0191360 | A1 | 7/2013 | Burkard |
| 2013/0232256 | A1 | 9/2013 | Lee |
| 2013/0298007 | A1 | 11/2013 | Cullen |
| 2013/0325856 | A1 | 12/2013 | Soto Matamala et al. |
| 2014/0279997 | A1 | 9/2014 | Chiussi |
| 2014/0316890 | A1 | 10/2014 | Kagan |

OTHER PUBLICATIONS

"App Linking," [online][Retrieved on Jan. 7, 2014]; Retrieved from the Internet URL: https://developers.facebook.com/docs/android/link-to-your-native-app/; 14 pages.

"Class Gecko View Content," [online][Retrieved on Jan. 2, 2014]; Retrieved from the Internet URL: people.mozilla.org/~mfinkle/geckoview/docs/org/Mozilla/gecko/GeckoViewContent.html; 4 pages.

"Deeplink.me Lets Mobile Users Navigate Through a "Web" of Apps," [online][Retrieved on Dec. 13, 2013]; Retrieved from the Internet URL: techcrunch.com/2013/05/22/new-service-called-deeplink-me-will-let-mobile-users-navigate-through-a-web-of-apps/; 8 pages.

"Frequently Asked Questions—General Information," [online][Retrieved on Jan. 7, 2014]; Retrieved from the Internet URL: https://linksmanager.com/Frequently+Asked+Questions+-+General+Information; 8 pages.

"Google's Search Results Can Deep-Link to Your Android Apps," [online][Retrieved on Dec. 13, 2013]; Retrieved from the Internet URL: techcrunch.com/2013/10/31/android-4-4-kitkat-app-indexing/; 6 pages.

"How to determine when an application is fully launched?" [online][Retrieved on Jan. 2, 2014]; Retrieved from the Internet URL: social.msdn.microsoft.com/Forums/en-US/27e7353-eb4b-4e23-bf56-84f3efbbecba/how-to-determine-when-an-application-is-fully-launched; 5 pages.

"How to get a deep link of my application from the Windows Phone Marketplace using .NET code?" [online][Retrieved on Dec. 13, 2013]; Retrieved from stackoverflow.com/questions/13639564/how-to-get-a-deep-link-of-my-application-from-the-windows-phone-marketplace-usin; 2 pages.

"Indexing apps just like websites," [online][Retrieved on Dec. 13, 2013]; Retrieved from the Internet URL: googlewebmastercentral.blogspot.com/2013/10/indexing-apps-just-like-websites.html; 4 pages.

"Instant Pages on Google Chrome," [online][Retrieved on Dec. 16, 2013]; Retrieved from the Internet URL: chrome.blogspot.jp/2011/08/instant-pages-on-google-chrome.html; 3 pages.

"Mobile deep linking," [online][Retrieved on Dec. 13, 2013]; Retrieved from the Internet URL: en.wikipedia.org/wiki/Mobile_deep_linking; 2 pages.

"NSApplication Class Reference," [online][Retrieved on Jan. 2, 2014]; Retrieved from the Internet URL: https://developer.apple.com/library/mac/documentation/cocoa/reference/applicationkit/classes/NSApplication_Class/Reference/Reference.html; 66 pages.

"Ready for a "Web" of Apps? Quixey Launches AppURL, A New Way to Enable Deep Linking Across Mobile Applications," [online][Retrieved on Dec. 13, 2013]; Retrieved from the Internet URL: techcrunch.com/2013/08/02/ready-for-a-web-of-apps-quixey-launches-appurl-a-new-way-to-enable-deep-linking-across-mobile-applications/; 8 pages.

"Seven Tips for Supercharging Your Links," [online][Retrieved on Jan. 7, 2014]; Retrieved from the Internet URL: goarticles.com/article/Seven-Tips-For-Supercharging-Your-Links/3056299/; 5 pages.

"Sharing to Google+ from your Android app," [online][Retrieved on Jan. 7, 2014]; Retrieved from the Internet URL: https://developers.google.com/+/mobile/android/share/#handling_incoming_deep_links; 2 pages.

Google Play Store [online]. [retrieved on Mar. 11, 2013]. Retrieved from the Internet: <URL: https://play.google.com/store>, 3 pages.

"Visability for Your Apps/Android Developers" Developer. Andriod.com [online]. [retrieved on Mar. 11, 2013]. Retrieved from the Internet: <URL: http://developer.android.com/distribute/googleplay/about/visibility.html>, 6 pages.

Klais, "5 SEO Tips to Get Mobile Apps Ranked in SERPs," Search Engine Land [online], Dec. 19, 2011 [retrieved on Mar. 11, 2013]. Retrieved from the Internet: <URL: http://searchengineland.com/5-seo-tips-to-get-mobile-apps-ranked-in-serps-104595>, 6 pages.

International Search Report and Written Opinion in International Application No. PCT/US2014/053346, mailed Dec. 18, 2014, 8 pages.

NATIVE APPLICATION SEARCH RESULTS

CROSS-REFERENCE TO RELATED APPLICATIONS

This application is a continuation application of, and claims priority to, U.S. patent application Ser. No. 14/019,157, titled "NATIVE APPLICATION SEARCH RESULTS," filed on Sep. 5, 2013, and which issued as U.S. Pat. No. 9,311,047 on Apr. 12, 2016. The disclosure of the foregoing application is incorporated herein by reference in its entirety for all purposes.

BACKGROUND

The Internet provides access to a wide variety of information. For example, digital image files, video and/or audio files, as well as web page resources for particular subjects or particular news articles, are accessible over the Internet. With respect to web page resources, many of these resources are designed to facilitate the performing of particular functions, such as banking, booking hotel reservations, shopping, etc., or to provide information, such as on-line encyclopedias, movie databases, news, etc.

A variety of search engines are available for identifying particular resources accessible over the Internet. These search engines crawl and index the various web page resources. The search engine then uses the index to determine which resources are most responsive to a search query and provides search results that link to the resources in response to the query.

With the advent of tablet computers and smart phones, native applications that facilitate the performance of the same functions facilitated by the use of web page resources, or the provisioning of the same content by the use of web pages, are now being provided in large numbers.

SUMMARY

This specification describes technologies relating to search results for native applications.

In general, one innovative aspect of the subject matter described in this specification can be embodied in methods that include the actions of receiving a search request for a user device, the search request including: a query that includes one or more terms, and identification data for identifying native applications installed on the user device, each of the native applications being applications that operate independent of a browser application on the user device; receiving data identifying web resources responsive to the query; determining, from the identification data, a native application installed on the user device; determining that a first web resource of the web resources responsive to the query includes content for which synchronized content is accessible by the native application installed on the user device, and in response to this determination generating a native application search result that includes native application request data that causes the native application installed on the user device to request the synchronized content; and providing web resource search results and the native application search result to the user device, each respective web search result referencing a respective one of the web resources. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. A search engine need only index one corpus of content that is provided in a synchronized manner by a web site and by native applications, which reduces indexing resources relative to indexing a separate corpus of content for native applications. Furthermore, because the publisher's back-end infrastructure specific to the native application need not be crawled and indexed by the search engine, specialized search algorithms specific to the native application content need not be developed. Additionally, when a search query is received from a user device that has a native application installed, the search engine can provide a native application search result that, when selected at the user device, invokes the native application. Because native applications are designed with user interaction models that facilitate ease of use of the device on which they are installed, content is provided to users in a manner that facilitates ease of consumption. A native application thus can provide better user experience, such as faster loading than a web based resource, less bandwidth cost, and an optimized user interface. Additionally, because a native application is installed by the user, the user tends to prefer to interact with the native application over a web based resource. Finally, a native application is less susceptible to malware, viruses and other third party attacks because such software is typically directed to platforms that are used on a much wider scale that a particular native application.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A system provides native application search results. As used herein, a native application operates independent of a browser application on the user device. A native application is an application specifically designed to run on a particular user device operating system and machine firmware and not within a browser. Native applications thus differ from browsers, browser-based applications and browser-rendered resources. The latter require all, or at least some, elements or instructions downloaded from a web server each time they are instantiated or rendered. Furthermore, browser-based applications and browser-rendered resources can be processed by all web-capable mobile devices within the browser and thus are not operating system specific as are native applications. Furthermore, as used herein, a native application search result is a search result that corresponds to a particular native application and that, when selected, invokes the particular native application.

The system receives a search request for a user device. The search request includes a query and data for identifying native applications installed on the user device. The system also receives data identifying web resources responsive to the query. The system then determines if any of the web resource of the web resources responsive to the query includes content for which synchronized content is accessible by a native application installed on the user device. In response to a positive determination, the system generates a native application search result that causes the native application installed on the user device to request the synchronized content when the native application search result is selected on the user device. Web resource search results and the native application search result are then provided to the user device.

Operation of the system that indexes application page data and the processing of search results for application pages is described in more detail below.

Figure 1:
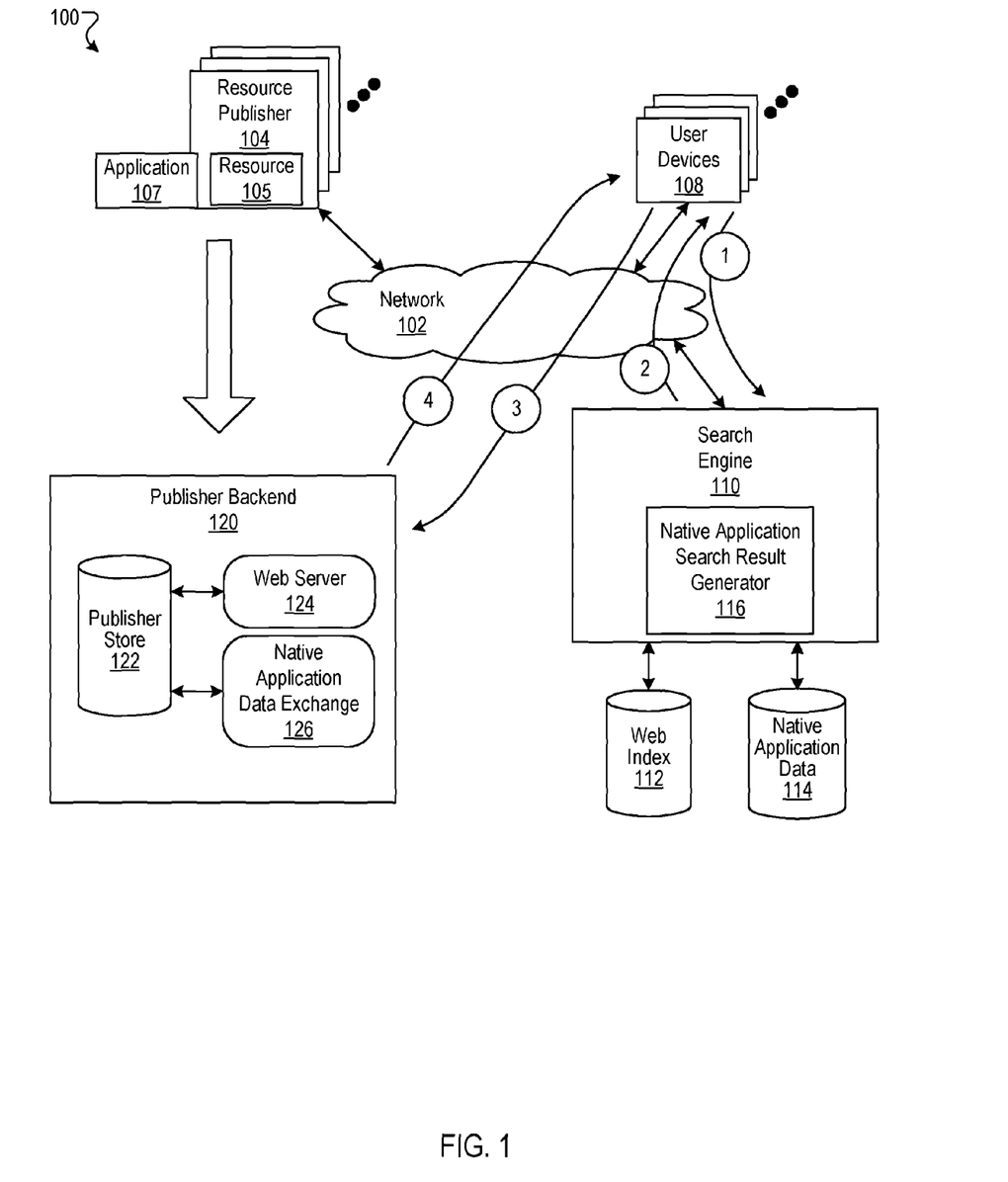
FIG. 1 is a block diagram of an example environment in which native application search results are provided with web resource search results in response to queries.

FIG. 1 is a block diagram of an example environment 100 in which native application search results are provided with web resource search results in response to queries. A computer network 102, such as the Internet, connects resource publisher web sites 104, application publishers 106, user devices 108 and a search engine 110.

A resource publisher website 104 includes one or more web resources 105 associated with a domain and hosted by one or more servers in one or more locations. Generally, a resource publisher website is a collection of web pages formatted in hypertext markup language (HTML) that can contain text, images, multimedia content, and programming elements. Each website 104 is maintained by a content publisher, which is an entity that controls, manages and/or owns the website 104.

A web page resource 105 is any data that can be provided by a publisher website 104 over the network 102 and that has a resource address, e.g., a uniform resource locator (URL). Web resources may be HTML pages, images files, video files, audio files, and feed sources, to name just a few. The resources may include embedded information, e.g., meta information and hyperlinks, and/or embedded instructions, e.g., client-side scripts.

A publisher 105 may also provide a native application 107. As described above, a native application 107 is an application specifically designed to run on a particular user device operating system and machine firmware. Many publishers 104 provide the same content in both web resources and native applications. The management of the delivery of such content is handled by a publisher backend 120. The publisher backend 120 includes a publisher store 122 that stores content the publisher provides, a web server 124 that provides the content from the publisher store as web resources (e.g., web pages), and a native application data exchange 126 that handles requests from a native application. The content of the publisher store 122 is accessible for presentation on both the web resources and the native application. Accordingly, such content is referred to as "synchronized" content.

Examples of such publishers are news publishers, which may have a "mobile news app" for reading news content on a mobile device. The news content (e.g., the text of a news story) provided on the web resource 105 is the same content that is provided by the native application 107.

A user device 108 is an electronic device that is under the control of a user. A user device 108 is typically capable of requesting and receiving web page resources 104 and native applications 107 over the network 102. Example user devices 108 include personal computers, mobile communication devices, and tablet computers.

The web index 112 is an index of publisher content that has, for example, been built from crawling the publisher web sites 104, by receiving data feeds from the publisher websites 104, or by other appropriate methods of collecting and indexing data.

The native application index 114 stores data relating to native applications 107. The application index 114 stores, for example, a list of native applications provided by the publishers 104 and identifiers that identify the native applications. Furthermore, in some implementations, publishers 104 may specify that certain native applications 107 are used to access and display synchronized data, and this information may be stored in the application index. For example, a news publisher of may specify that a news reading application it provides displays synchronized content that is displayed on the news publisher's website. Data specifying this relationship may be, for example, a tuple that pairs a native application identifier with the domain name (or other identifiers or resource locators) of the publisher.

The publisher may, in some implementations, specify what data the native application requires to access content provided on a web resource. For example, the publisher may specify that only the URL of a web resource is required by the native application to access and display the content displayed in the web resource. The application index 114 may also store additional information, depending on the implementation, and as described in more detail below.

The user devices 108 submit search queries to the search engine 110. In response to each query, the search engine 110 accesses the web index 112 and the application index 114 to identify content that is relevant to the query. The search engine 110 may, for example, identify the resources and applications in the form of web resource search results and native application search results, respectively. Once generated, the search results are provided to the user device 108 from which the query was received.

A web resource search result is data generated by the search engine 110 that identifies a web resource, based on the content of the resource, that satisfies a particular search query. A web resource search result for a resource can include a web page title, a snippet of text extracted from the resource, and a uniform resource identifier (URI) for the resource, e.g., the uniform resource locator (URL) of the web page. When selected at a user device, the web resource search result causes the user device to generate a request for the resource located at the URL. The web resource that is received is then displayed in a browser application.

A native application search result specifies a native application and is generated in response to a search of the application index 114 and the web index 112, as described in more detail below. When selected at a user device, the native application search result causes the native application installed on the user device to request the synchronized content. Once the native application receives the requested content, the native application displays the content in a user interface of the native application.

Figure 2:
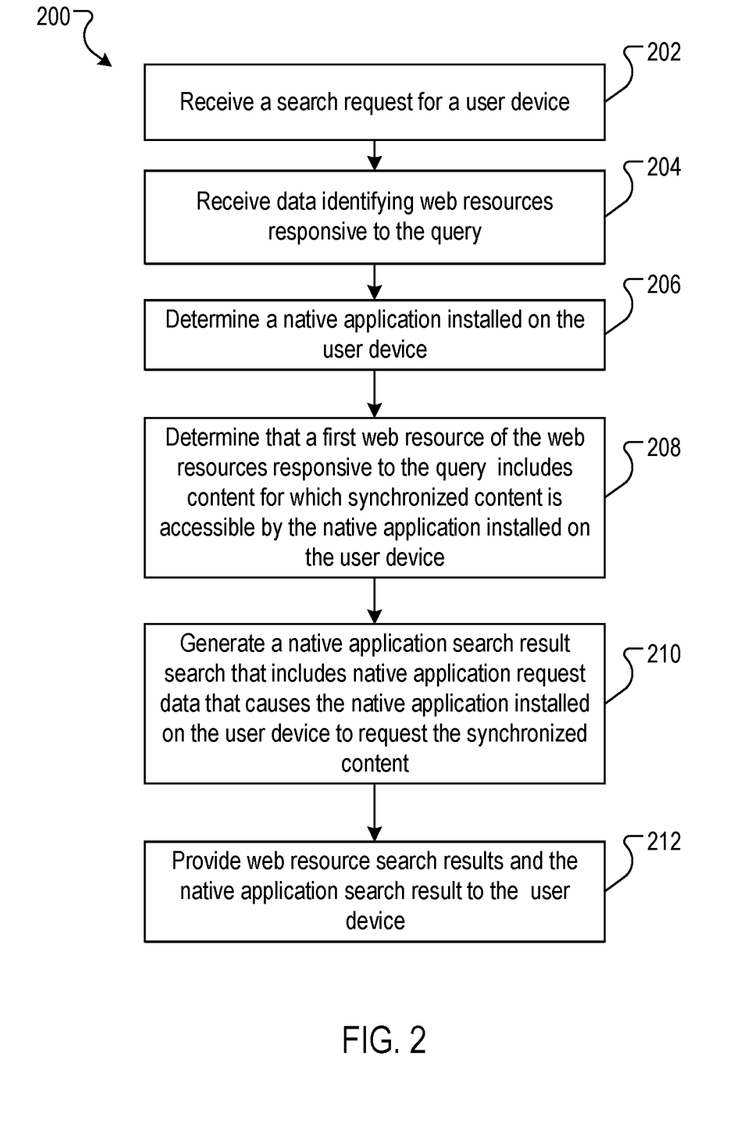
FIG. 2 is a flow diagram of an example process for generating and providing native application search results.

The identification of native applications and the generation of native application search results described with reference to FIG. 1 are described in more detail with reference to FIG. 2, which is a flow diagram of an example process 200 for generating and providing native application search results. The process 200 can be implemented in a data processing apparatus of one or more computers in data communication.

The process 200 receives a search request for a user device (202). The search request includes a query that includes one or more terms and identification data for identifying native applications installed on the user device. As shown in FIG. 1, flow element 1 depicts a search request transmitted from a user device to the search engine 110.

In some implementations, the identification data are native application identifiers that identify native applications installed on the user device. For example, a browser application can be configured to access registry data or other configuration data of the user device that includes a list of installed native applications. Alternatively, in another implementation, the identification data for identifying native applications installed on the user device is a user device identifier that uniquely identifies the user device. The search engine 110 (or another system in data communication with the search engine) can accesses account data for the device identifier, where the account data specifies native applications installed on the device. The account, for example, may be a user account through which a user purchases native applications for installation on the user device. If the account is tied to more than one user device, where each device may have different native applications installed, then the identification data can be a combination of the device identifier and an account identifier different from the device identifier. As both identifiers are tied to the account, the account data specifies the native applications installed on each user device tied to the account. The account data can be stored in the native application data 114, or be accessible by the native application search result generator 116.

The process 200 receives data identifying web resources responsive to the query (204). For example, the native application search result generator 116 receives data identifying resources that are determined to be responsive to the query. An example of such data is a list of URL's (or other resource identifiers), and, for each resource, a score indicating the relevance of the content of the resource to the query. The search engine 110 may determine the web resources that are responsive and provide the data to the native application search result generator 116.

The process 200 determines a native application installed on the user device (206). For example, the native application search result generator 116 processes the identification data provided in the search request to determine the native applications. If the identification data are a list of native application identifiers, then the native application search result generator 116 accesses the native application data 114 using the native application identifiers. Alternatively, if identification data for identifying native applications installed on the user device is a user device identifier (and/or account identifier) that uniquely identifies the user device, then the native application search result generator 116 accesses the native application data to search the account data (or accesses the account data if the account data are not stored in the native application data 114) to determine the native applications installed on the user device.

The process 200 determines that a first web resource of the web resources responsive to the query includes content for which synchronized content is accessible by the native application installed on the user device (208). For example, a first web resource may be published by a resource publisher having a first domain name. The publisher 104 may have specified that a particular native application that was identified in step 206 is used to access and display synchronized data that would be displayed in the first web resource. Accordingly, the first web resource is determined to include content for which synchronized content is accessible by the native application installed on the user device.

The process 200 generates a native application search result that includes native application request data that causes the native application installed on the user device to request the synchronized content (210). The native application search result includes request data the causes the native application to request the content that would be displayed in the first web resource. The type of request data that is provided depends on the native application. For example, some native applications can accept a URL of a web page as input and then transmit the URL of the web page to a native application data exchange 126 in the publisher backend 120. The native application data exchange 126 then uses the URL to access the publisher store 122 and identify the content to provide to the native application. For example, the native application data exchange 126 may be configured to extract the corresponding content for each web page resource and provide the content to the native application. In such implementations, the native application search result may include a command line with the URL as a command line argument that is passed to the publisher backend 120 when the native application is launched in response to a selection of the native application search result.

The process 200 provides web resource search results and the native application search result to the user device (212). For example, the providing of the web resource search results and the native application search result are depicted in FIG. 1 by flow element 2. Upon receipt, the user device 108 renders the search results for display.

Figure 3:
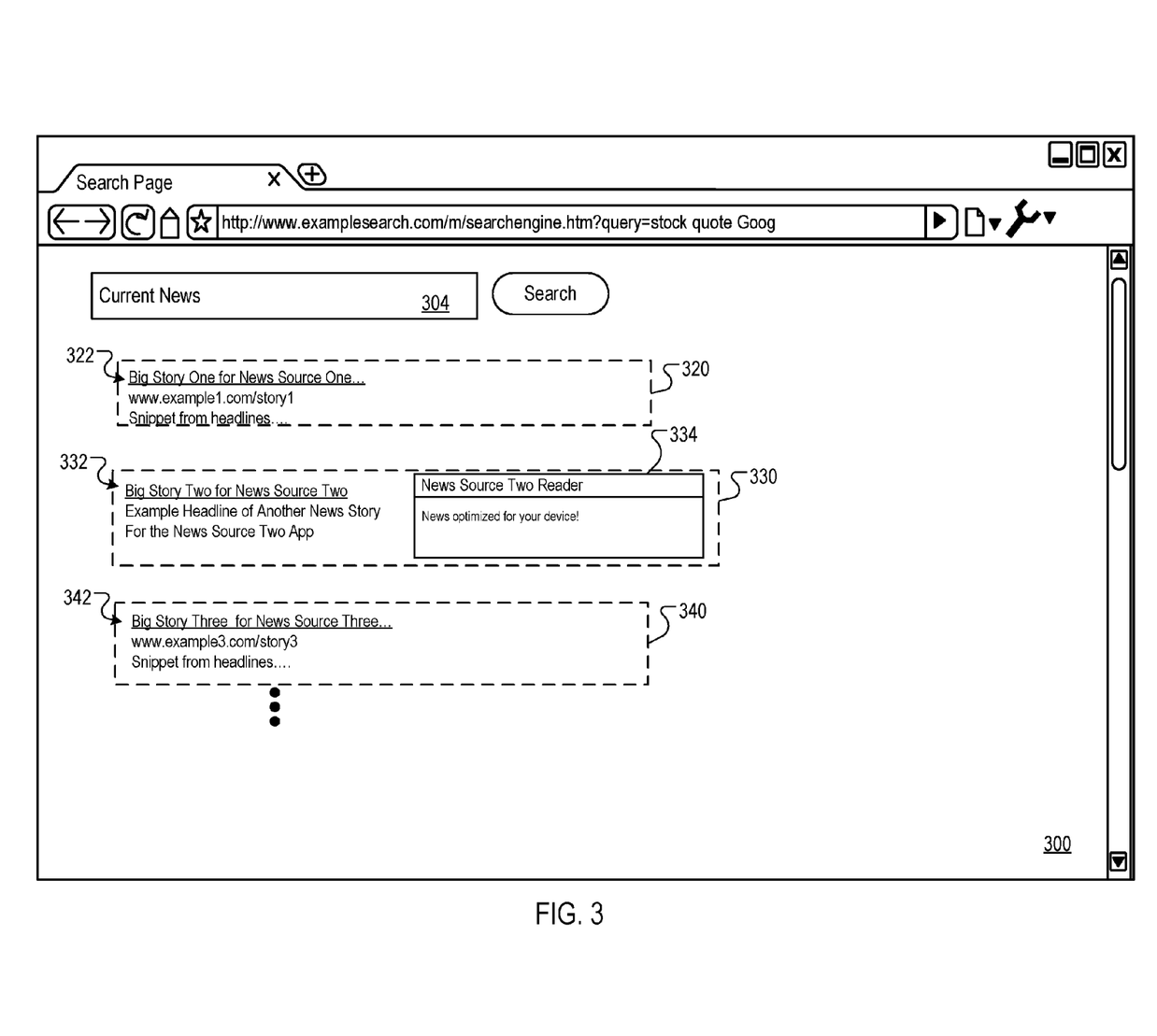
FIG. 3 is an illustration of a search results page that includes a native application search result.

FIG. 3 is an illustration of a search results page 300 that includes a native application search result. Displayed in the search results page 300 are search results 320, 330, and 340 that are responsive to the query "current news" displayed in the search input field 304. The search results 320 and 340 are web search results generated in response to a search of a web index 112 of resources. Each search result 320 and 340 references a resource that can be rendered in a browser application on a user device and includes a URL link to the resource, and other data 322 and 342, such as a snippet of text extracted for the referenced resource.

The search result 330 is a native application search result that is generated in response to the native application search result generator 116 determining determines that web resource includes content for which synchronized content is accessible by the native application installed on the user device. The native application search result 330 may include, for example, a snippet 332 of text and an image 334 of the native application display. The snippet 332 may be extracted from the web resource. In this example, the snippet 332 is a headline and text of a news story. The image 334 may be, for example, an image of a user interface of the native application. The image 334 helps visually distinguish the native application search result 330 from the web resource search results.

Embedded in the native application is request data that the native application uses to request content upon launching. The request data may be, for example, the URL of the resource that includes the synchronized content. The URL, however, is not shown so as to avoid confusion that the native application search result 330 is a web resource search result.

In some implementations, selection of the image 334, or any other portion of the native application search result 332, at the user device causes the native application to launch and request the content that is relevant to the search query. Note that if the native application were not installed on the user device 108, then the search result 330 would be a web resource search result instead of a native application search result. Likewise, if a native application for "News Source Three" were installed on the user device 108, then the web search result 340 would be a native application search result that would invoke the native application for "News Source Three."

Figure 4:
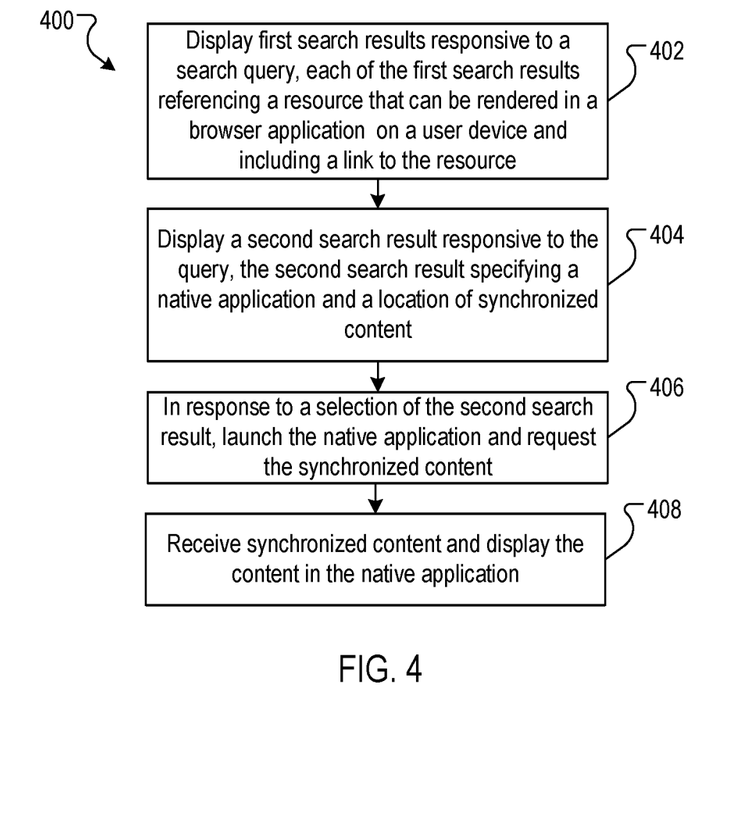
FIG. 4 is a flow diagram of an example process of launching a native application and displaying synchronized content in the native application.

FIG. 4 is a flow diagram of an example process 400 for launching processing search results at a user device and launching a native application and displaying synchronized content in the native application. The process 400 can be implemented in a user device.

The process 400 displays first search results responsive to a search query, each of the first search results referencing a resource that can be rendered in a browser application on a user device and including a link to the resource (402). For example, as described above, a web server for a search engine may receive web search results 320 and 340 responsive to a query.

The process 400 displays a second search result responsive to the query, the second search result specifying a native application and a location of synchronized content (404). Again, as described above, a web server for a search engine may receive native application search result 330 responsive to the query.

The process 400, in response to a selection of the second search result, launches the native application and request the synchronized content (406). For example, as depicted in FIG. 1 by flow line 3, the user device requests the content from the publisher backend in response to the launching of the native application.

The process 400 receives the synchronized content and displays the content in the native application (408). For example, as depicted in FIG. 1 by flow line 4, the user device receives the content, and the user device then displays the content within the native application.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system, comprising:
a data processing apparatus of a search system; and
software stored in non-transitory computer readable storage medium storing instructions executable by the data processing apparatus and that upon such execution cause the data processing apparatus to perform operations comprising:
receiving, at the search system, a search request for a user device, the search request including a query that includes one or more terms; and
receiving, by the search system, data identifying resources responsive to the query, each of the resources being a resource that is configured to be displayed in a first application and including content that is displayed as part of the resource in the first application, and wherein each resource is determined to be responsive to the query based on the content that is displayed as part of the resource in the first application;
determining, by the search system, that a first resource of the resources responsive to the query includes synchronized content stored at a data store and that is accessible from the data store for display by a native application, wherein:
the native application operates independent of the first application; and
the synchronized content for the first resource is the same content that is displayed in the native application;
in response to this determination:
generating a native application search result that includes native application request data that causes the native application to request the synchronized content when the search result is selected by a user using the first application; and
providing, by the search system, the native application search result to the user device.

2. The system of claim 1, wherein determining, by the search system, that a first resource of the resources responsive to the query includes synchronized content stored at a data store and that is accessible from the data store for display by a native application comprises accessing data that specifies that a provider of the first resource provides the synchronized content accessible by the native application.

3. The system of claim 2, wherein generating a native application search result that includes native application request data comprises generating a native application search result that includes native application request data in the form of a uniform resource identifier of the first resource.

4. The system of claim 1, further comprising:
receiving identification data for identifying native applications installed on the user device;

determining, from the identification data, a native application installed on the user device; and generating a native application search result comprises generating a native application search result for the native application determined to be installed on the user device.

5. The system of claim 4, wherein determining that a first web resource of the web resources responsive to the query includes synchronized content stored at a data store that is accessible from the data store for display by the native application installed on the user device comprises accessing data that specifies that a provider of the first resource provides the synchronized content accessible by the native application.

6. A non-transitory computer readable storage medium storing instructions executable by a data processing apparatus of a search system and that upon such execution cause the data processing apparatus to perform operations comprising:

receiving, at the search system, a search request for a user device, the search request including a query that includes one or more terms; and receiving, by the search system, data identifying resources responsive to the query, each of the resources being a resource that is configured to be displayed in a first application and including content that is displayed as part of the resource in the first application, and wherein each resource is determined to be responsive to the query based on the content that is displayed as part of the resource in the first application;

determining, by the search system, that a first resource of the resources responsive to the query includes synchronized content stored at a data store and that is accessible from the data store for display by a native application, wherein:

the native application operates independent of the first application; and the synchronized content for the first resource is the same content that is displayed in the native application;

in response to this determination:

generating a native application search result that includes native application request data that causes the native application to request the synchronized content when the search result is selected by a user using the first application; and providing, by the search system, the native application search result to the user device.

7. The non-transitory computer readable storage medium of claim 6, wherein determining, by the search system, that a first resource of the resources responsive to the query includes synchronized content stored at a data store and that is accessible from the data store for display by a native application comprises accessing data that specifies that a provider of the first resource provides the synchronized content accessible by the native application.

8. The non-transitory computer readable storage medium of claim 7, wherein generating a native application search result that includes native application request data comprises generating a native application search result that includes native application request data in the form of a uniform resource identifier of the first resource.

9. The non-transitory computer readable storage medium of claim 6, further comprising:

receiving identification data for identifying native applications installed on the user device;

determining, from the identification data, a native application installed on the user device; and generating a native application search result comprises generating a native application search result for the native application determined to be installed on the user device.

10. The non-transitory computer readable storage medium of claim 9, wherein determining that a first web resource of the web resources responsive to the query includes synchronized content stored at a data store that is accessible from the data store for display by the native application installed on the user device comprises accessing data that specifies that a provider of the first resource provides the synchronized content accessible by the native application.

11. A method implemented in a search system, comprising:

receiving, at the search system, a search request for a user device, the search request including a query that includes one or more terms; and receiving, by the search system, data identifying resources responsive to the query, each of the resources being a resource that is configured to be displayed in a first application and including content that is displayed as part of the resource in the first application, and wherein each resource is determined to be responsive to the query based on the content that is displayed as part of the resource in the first application;

determining, by the search system, that a first resource of the resources responsive to the query includes synchronized content stored at a data store and that is accessible from the data store for display by a native application, wherein:

the native application operates independent of the first application; and the synchronized content for the first resource is the same content that is displayed in the native application;

in response to this determination:

generating a native application search result that includes native application request data that causes the native application to request the synchronized content when the search result is selected by a user using the first application; and providing, by the search system, the native application search result to the user device.

12. The method of claim 11, wherein determining, by the search system, that a first resource of the resources responsive to the query includes synchronized content stored at a data store and that is accessible from the data store for display by a native application comprises accessing data that specifies that a provider of the first resource provides the synchronized content accessible by the native application.

13. The method of claim 12, wherein generating a native application search result that includes native application request data comprises generating a native application search result that includes native application request data in the form of a uniform resource identifier of the first resource.

14. The method of claim 11, further comprising:

receiving identification data for identifying native applications installed on the user device;

determining, from the identification data, a native application installed on the user device; and generating a native application search result comprises generating a native application search result for the native application determined to be installed on the user device.

* * * * *